US007387218B2

(12) United States Patent
Pottish et al.

(10) Patent No.: US 7,387,218 B2
(45) Date of Patent: Jun. 17, 2008

(54) APPARATUS AND METHOD FOR OPEN THREAD, REUSABLE, NO-WASTE COLLAPSIBLE TUBE DISPENSERS

(75) Inventors: Susan Pottish, 216 W. Perkins, #303, Ukiah, CA (US) 95482; Howard Mullin, Newark, CA (US); Scott Anderson, 216 W. Perkins, #303, Ukiah, CA (US) 95482; Morris Pottish, New York, NY (US)

(73) Assignees: Susan Pottish, Ukiah, CA (US); Scott Anderson, Ukiah, CA (US)

( * ) Notice: Subject to any disclaimer, the term of this patent is extended or adjusted under 35 U.S.C. 154(b) by 561 days.

(21) Appl. No.: 10/928,676

(22) Filed: Aug. 26, 2004

(65) Prior Publication Data

US 2006/0043105 A1 Mar. 2, 2006

(51) Int. Cl.
*B65D 35/00* (2006.01)
*B65D 25/32* (2006.01)
*B65D 51/16* (2006.01)

(52) U.S. Cl. .................. 222/107; 222/562; 215/307; 215/354; 220/775; 220/776

(58) Field of Classification Search .......... 222/92, 222/107, 104, 153.04, 212, 489, 562; 215/307, 215/354, 355, 357, 313, 314, 284, 329, 44, 215/276, 272; 220/259.3, 367, 256.1, 288, 220/289, 296, 366.1, 303, 367.1
See application file for complete search history.

(56) References Cited

U.S. PATENT DOCUMENTS

| | | |
|---|---|---|
| 2,252 A | 9/1841 | Rand |
| 675,372 A | 6/1901 | Brooks |
| 1,233,802 A | 7/1917 | Lowe et al. |
| 1,293,860 A | 2/1919 | Mock |
| 1,504,920 A | 8/1924 | Viegelmann |
| 1,575,567 A | 3/1926 | Geake |
| 1,592,584 A | 7/1926 | Jensen |
| 1,690,654 A | 11/1928 | Trotter |
| 2,101,855 A | 12/1937 | Henderson |

(Continued)

OTHER PUBLICATIONS

Earle Jennings performed we search results from Apr. 12, 2003, 42 pages.

(Continued)

*Primary Examiner*—Kevin Shaver
*Assistant Examiner*—Stephanie E. Tyler
(74) *Attorney, Agent, or Firm*—Earle Jennings (57) ABSTRACT

The invention includes a method of using a cap containing an internal thread form matching an external thread form on a flexible throat for a collapsible tube enclosing at least one contained product. Twisting the cap engages the internal thread form and the external thread form. These collectively urge the cap and the flexible throat to seal the contained product into the collapsible tube. Deforming the flexible throat through squeezing the collapsible tube dispenses essentially all the product. The collapsible tube may preferably include an external thread form on a flexible throat coupled to a flexible shoulder. The external thread form mates to a cap with an internal thread form urging the flexible throat to seal against the cap when the cap is twisted onto the flexible throat. The flexible throat and flexible shoulder flatten to dispense essentially all of the product.

32 Claims, 11 Drawing Sheets

U.S. PATENT DOCUMENTS

| | | | |
|---|---|---|---|
| 2,128,035 | A | 8/1938 | Boetel |
| 2,182,243 | A | 12/1939 | Baker |
| 2,200,923 | A | 5/1940 | Hoggatt |
| 2,605,018 | A * | 7/1952 | Croce et al. ............. 222/107 |
| 2,633,269 | A | 3/1953 | Hirschhorm |
| 2,893,710 | A | 7/1959 | Goodman |
| 3,510,893 | A | 5/1970 | Moore |
| 3,746,215 | A | 7/1973 | Ausnit et al. |
| 3,794,200 | A * | 2/1974 | Marks ............. 215/201 |
| 3,832,964 | A | 9/1974 | Rockefeller |
| 3,917,116 | A | 11/1975 | Mason |
| 4,492,548 | A | 1/1985 | Hubert |
| 4,526,297 | A | 7/1985 | Grimsley |
| 5,690,764 | A | 11/1997 | Dirksing et al. |
| 6,776,307 | B1 | 8/2004 | Hagihara |
| 2001/0027957 | A1 * | 10/2001 | Kano ............. 215/341 |
| 2002/0148854 | A1 | 10/2002 | Egerhazy |
| 2002/0179635 | A1 | 12/2002 | Incardona et al. |
| 2003/0029884 | A1 | 2/2003 | Rau |

OTHER PUBLICATIONS

Web site capture, "Flexa-Tube Graham Packaging", Aug. 11, 2004, 2 pages.
Web site capture, "Fasteners for Plastics", Aug. 11, 2004, 2 pages.
Web site capture, "News room", www.grahampackaging.com, Aug. 11, 2004, 2 pages.
Web site capture, "Product overview: Hagy System", www.packexpo.com, Jul. 7, 2005, 6 pages.
Web site capture, "Spiralock Corp. introduces new fastener thread form", www.spiralock.com, Aug. 11, 2004, 3 pages.

* cited by examiner

APPARATUS AND METHOD FOR OPEN THREAD, REUSABLE, NO-WASTE COLLAPSIBLE TUBE DISPENSERS

BACKGROUND OF THE INVENTION

1. Field of the Invention

The invention relates to open thread screw and cap mechanisms with particular application to forming collapsible tube dispensers.

2. Background Information

The earliest collapsible tube dispensers in the US patent database date from the early nineteenth century. Since that time, there has been continued innovation, leading to the various collapsible tube dispensers used for pharmaceuticals, personal care products, toothpaste, foods, artist's paints, glues, hazardous chemicals, grease products and viscous plastics, to name some of the more common uses of these tubes. As used herein, personal care products include, but are not limited to, cosmetics, facial care products, skin care products, and/or hair care products.

There are problems with the collapsible tube technologies of the prior art. They do not lend themselves both to being reusable and supporting the complete, controlled dispensing of their contents. As the term is used herein, reusable will refer to the capability to dispense small, or controlled, portions of the contents multiple times, perhaps on different occasions. Reusable may further refer to the capability to refill the contents multiple times. And reusable may further refer to a container, which can be cleaned, and refilled with differing contents.

One prior art collapsible tube dispenses all the tube's contents and is reuseable. The tube is not cylindrical but a two-sided pouch of soft plastic material. The tube has a mechanism of closing the throat, requiring no conventional screw and cap. The throat contains a soft plastic sheet insert that effectively sucks itself closed when pressure is released. This tube may be limited to applications in which there is no unexpected or forceful pressure applied to the tube. Example applications where it is not applicable include being packed in a suitcase, or purse, since the closure responds to finger pressure. The tube may also be limited to applications in which a high degree of barrier to the environment is not critical, such as pharmaceuticals, because the opening does not clean itself when closing except to the degree that it draws contents outside the tube to the inside of the tube. It may be undesirable for personal care products or other products demanding a high degree of aesthetic features, such as oversized caps allowing the tube to stand vertically.

There are some one-time use containers made essentially of a squeeze tube with a narrow end, which is cut to open the tube. All of the contents are then squeezed out, and the tube is discarded. These one-time use containers are not reusable, and represent a significant amount of overhead both for the manufacturer and for the ecology of people and systems, which must cope with these discarded containers.

With the exception of some one-time use containers, collapsible tube dispensers typically possess a rigid shoulder and a rigid throat. The rigid throat provides an exterior, rigid screw. This exterior rigid screw mates with a cap providing a matching interior screw pattern. When the cap is screwed onto the exterior screw of the throat, a seal is formed, which seals in the contents of the collapsible tube.

For the last century or two, screws have been built with either threads that taper away from the body, or remain of constant thickness. These screw threads will be referred to herein as open threads. Up until now, using these open thread screws requires that the throat of a collapsible tube be essentially rigid. An essentially rigid throat on a collapsible tube dispenser virtually guarantees that some of the tube contents will not readily leave the tube, causing the tube to waste some of its contents. The rigid shoulder further guarantees this waste.

The use of tubes for carrying food in sports and wilderness exploration environments is known. None on the market, however, are both reusable and completely collapsible. Thus, they do not dispense all their contents. A refillable tube that does dispense all its contents is especially desirable when food is otherwise scarce.

Figure 1A:
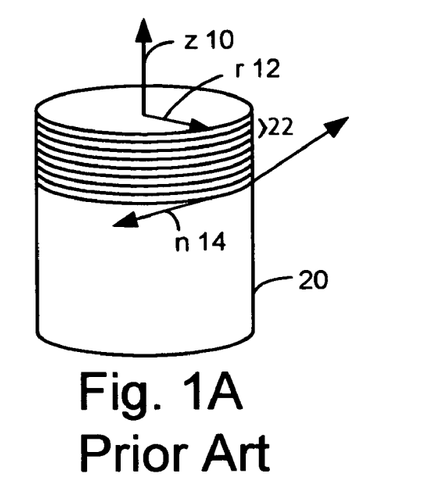
FIG. 1A shows a prior art exterior screw with a prior art external thread form.

FIG. 1A shows a prior art exterior screw 20 with a prior art external thread form 22. The prior art external thread form 22 is shown in an expanded view through the following examples shown in FIGS. 1B and C with a matching internal thread form 24.

There is a local coordinate system in FIG. 1A, which will be used throughout this document. The z axis 10 extends through the center of the cylinder of the prior art exterior screw 20, and is the central axis of the cylinder. The r axis 12 is the radial direction of the thread at a point, which, for the sake of discussion, is referred to as thread point 22 in FIG. 1A. The n axis 14 is normal to the thread point 22. When the screw is turned in the n direction, it engages more of the threads.

The engagement of an exterior screw thread and matching interior screw is shown in the expanded view of the prior art open screw thread 22 in FIG. 1A. The expanded view is a cross-section of the threads taken in the plane of the z axis 10 and the r axis 12.

Figure 1B:
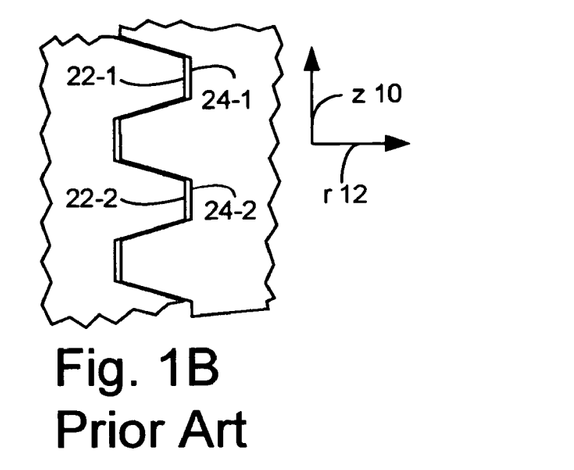
FIG. 1B shows a prior art example of FIG. 1A using a standard acme thread for the external thread form and the matching internal thread form.
Figure 1C:
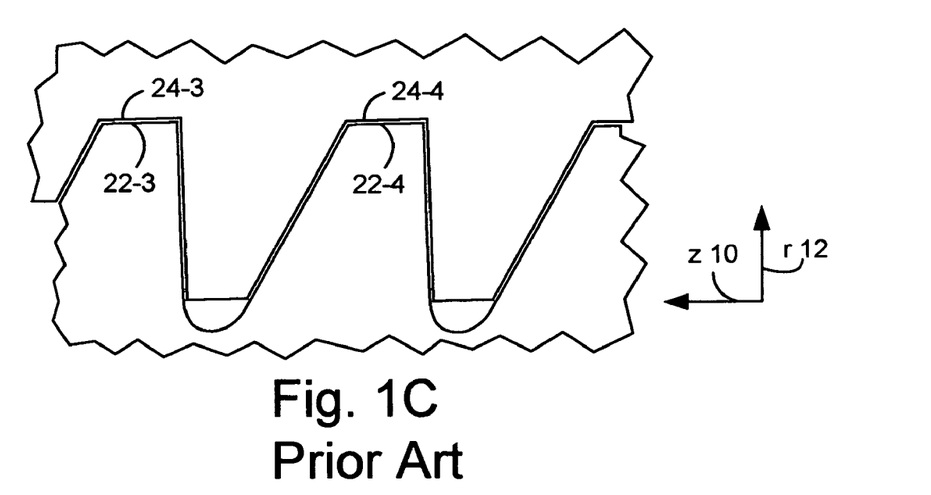
FIG. 1C shows a prior art example of FIG. 1A using a standard buttress thread for the external thread form and the matching internal thread form.

FIG. 1B shows an example of FIG. 1A using a standard acme thread for the external thread form 22 and the matching internal thread form 24. A first external acme thread 22-1 matches the first internal acme thread 24-1. A second external acme thread 22-2 with the second internal acme thread 24-2.

FIG. 1C shows an example of FIG. 1A using a standard buttress thread for the external thread form 22 and the matching internal thread form 24. A first external buttress thread 22-3 matches the first internal buttress thread 24-3. A second external buttress thread 22-4 with the second internal buttress thread 24-4.

Figure 1D:
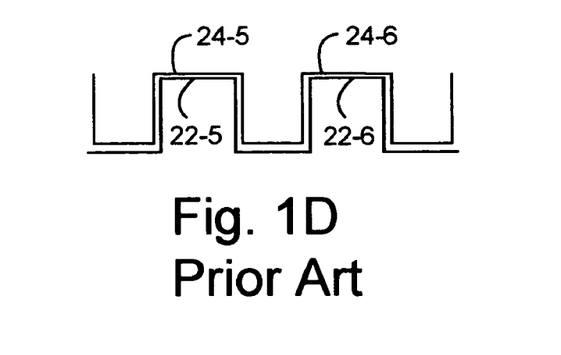
FIG. 1D shows an example of FIG. 1A using a box thread for the external thread form and the matching internal thread form.

FIG. 1D shows an example of FIG. 1A using a box thread for the external thread form 22 and the matching internal thread form 24. A first external box thread 22-5 matches the first internal box thread 24-5. A second external box thread 22-6 with the second internal box thread 24-6.

One skilled in the art will recognize that FIGS. 1B to 1D show some of the many variations in open threads in use today. Other commonly used threads include various "V" shaped threads, as well as variations in angles of the walls, variations in the shape of the peaks and troughs of the threads.

To summarize, what is needed is a reusable collapsible tube, which can dispense essentially all of its contents. There is a need for reusable collapsible tubes which may be reopened to load the contents, particularly for food containers for use in travel and wilderness settings.

SUMMARY OF THE INVENTION

The invention includes a method of using a cap containing an internal thread form matching an external thread form on a flexible throat for a collapsible tube enclosing at least one contained product. Twisting the cap engages the internal thread form and the external thread form. These collectively urge the cap and the flexible throat to seal the contained product into the collapsible tube. Deforming the flexible throat through squeezing the collapsible tube dispenses essentially all of the contained product.

This method of using a collapsible tube permits dispensing essentially all of the contained product. The collapsible tube is also reusable, permitting its use in a variety of fields where today everyone is forced to waste the last part of the contained product. This is valuable in such diverse areas of application as pharmaceuticals, personal care products, toothpaste, foods, artist's paints, glues, hazardous chemicals, grease products, and viscous plastics.

The collapsible tube may preferably include an external thread form on a flexible throat coupled to a flexible shoulder mating to a collapsible tube body. The external thread form mates to a cap with an internal thread form urging the flexible throat to seal against the cap when the cap is twisted onto the flexible throat. The flexible throat and the flexible shoulder flatten with the collapsible tube body to dispense essentially all of the product.

The external thread form may preferably include at least two external open threads. These external open thread preferably include at least one break. The break may form a column, a canted column, or a fluted column. The fluted column may widen toward the flexible shoulder, or away from the flexible shoulder.

DETAILED DESCRIPTION

The invention's collapsible tubes preferably utilize a flexible shoulder 504, shown in FIGS. 2A to 11D, being squeezed toward the flexible throat 502, which concentrates the contents 900 so that very little is wasted in normal use. FIGS. 2A to 11D show various embodiments of a collapsible tube 500, including at least a first break 600 forming various columns in the radial axis of the flexible throat 502.

Figures 2A, 2B:
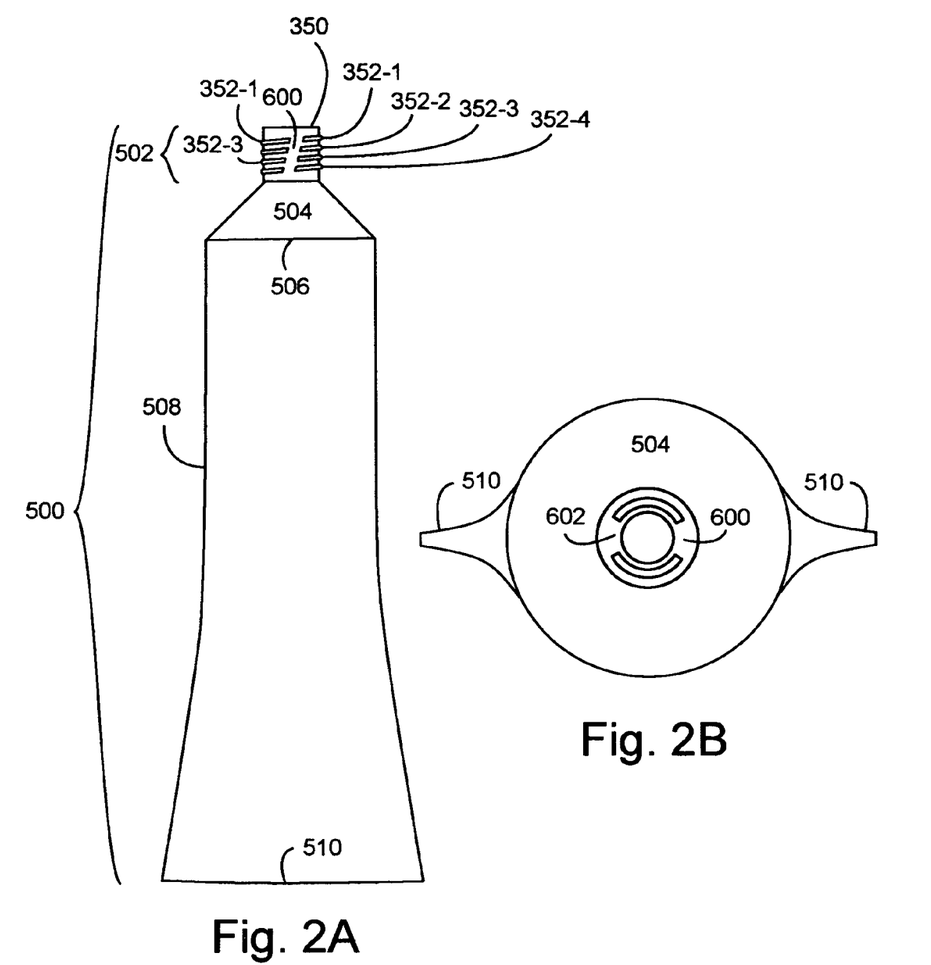
FIG. 2A shows a top view of a collapsible tube showing a first break forming a canted column.
FIG. 2B shows a front view of the collapsible tube in FIG. 2A showing a first break and a second break.
Figure 3A:
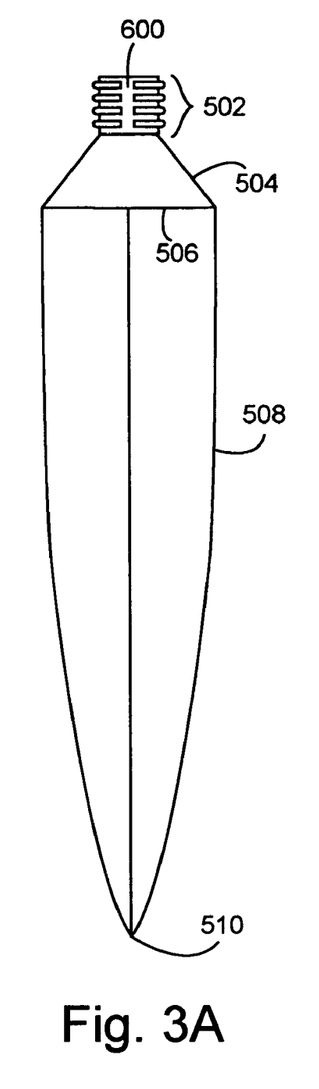
FIG. 3A shows a side view of the collapsible tube in FIG. 2A with the first break forming rectangular column.

FIG. 2A shows a top view of the collapsible tube 500 showing a first break 600 forming a canted column. FIG. 2B shows a front view of the collapsible tube 500 in FIG. 2A showing a first break 600 and a second break 602. FIG. 3A shows a side view of the collapsible tube 500 in FIG. 2A with the first break 600 forming rectangular column.

Figure 3B:
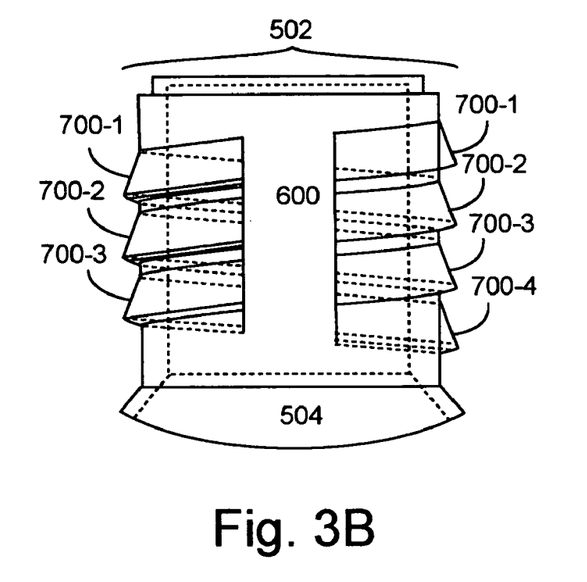
FIG. 3B shows a detail of FIG. 3A showing the flexible throat with a thread form including at least two, and in this case four open threads, which could be by way of example, external acme threads, external buttress threads, external V threads, external box threads, or combinations or modifications of these well known open threads.

FIG. 3B shows a detail of FIG. 3A showing the flexible throat 502 with a thread form including at least two, and in this case four open threads. These threads could, be by way of example, external acme threads, external buttress threads, external V threads, external box threads, or combinations or modifications of these well known open threads.

Figure 3C:
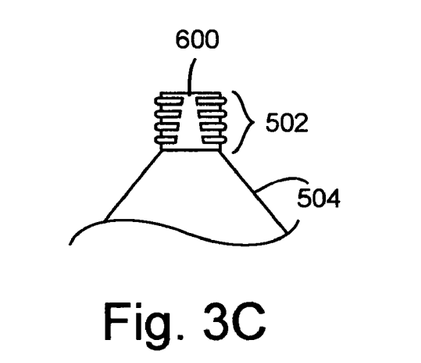
FIG. 3C shows the first break forming a fluted column expanding toward the flexible shoulder.

FIG. 3C shows the first break 600 forming a fluted column expanding toward the flexible shoulder.

Figure 3D:
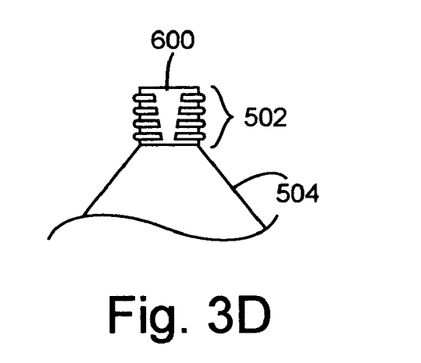
FIG. 3D shows the first break 600 forming a fluted column expanding away from the flexible shoulder.

FIG. 3D shows the first break 600 forming a fluted column expanding away from the flexible shoulder.

Figure 4:
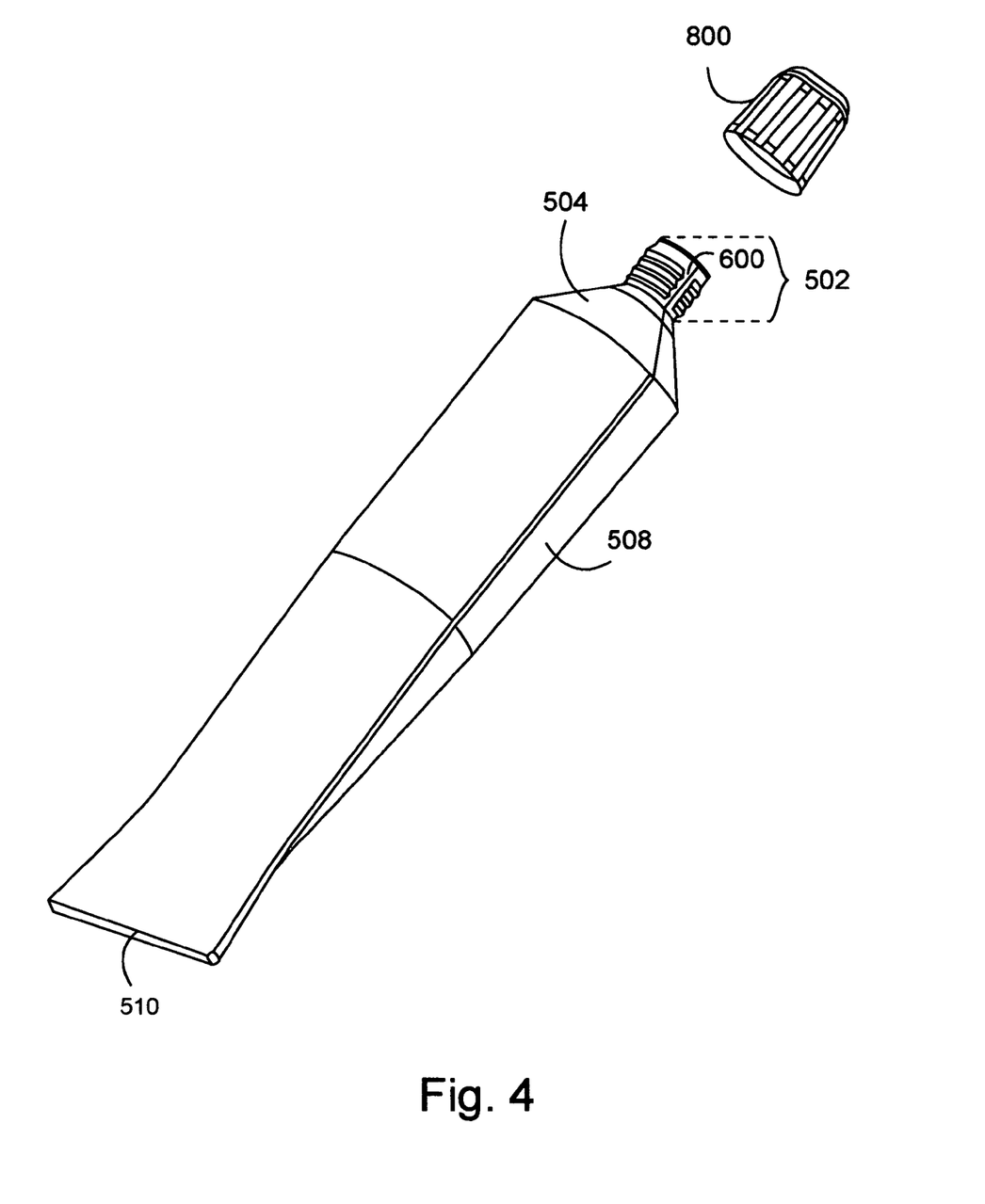
FIG. 4 shows the collapsible tube as in FIGS. 2B to 3B with a cap.

FIG. 4 shows the collapsible tube as in FIGS. 2B to 3B with a cap 800.

Figure 5A:
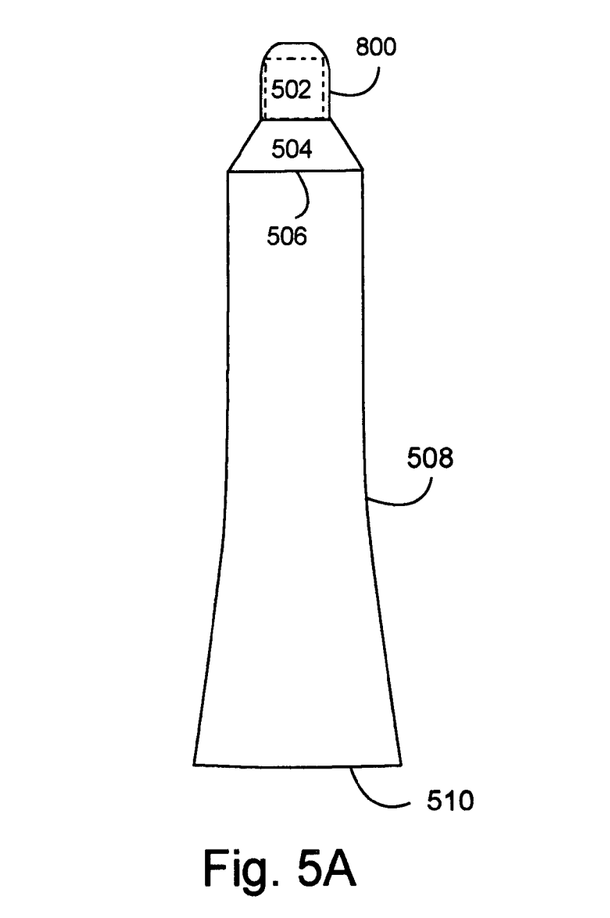
FIG. 5A shows the collapsible tube of FIG. 4 with the cap engaged and filled with at least one content.

FIG. 5A shows the collapsible tube of FIG. 4 with the cap 800 engaged and filled with at least one content.

Figure 5B:
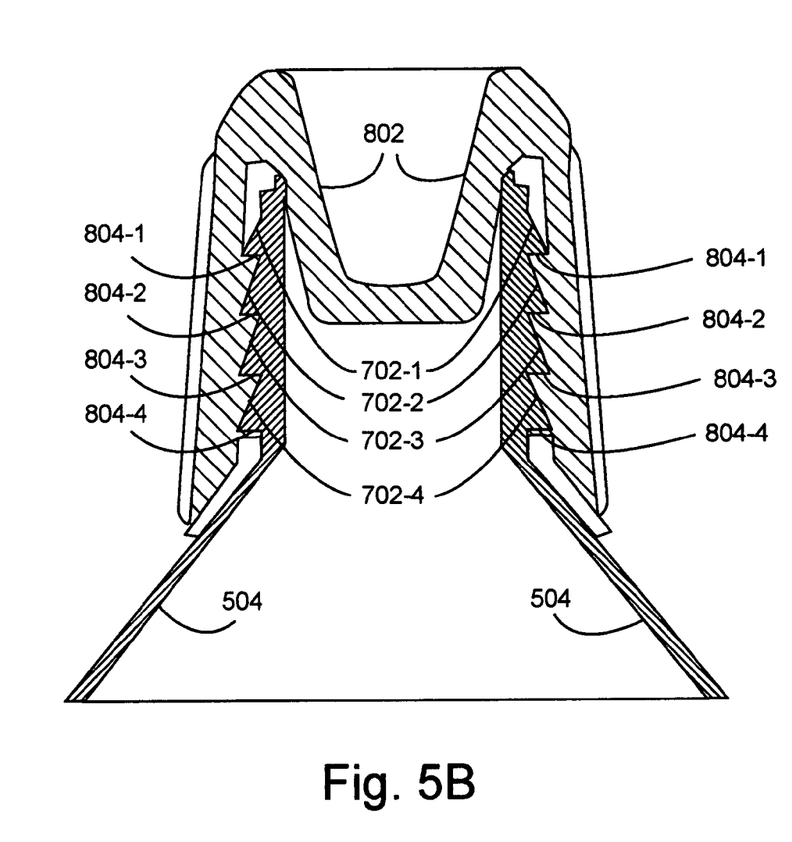
FIG. 5B shows a cross section of FIG. 5A of the collapsible shoulder, flexible throat engaging the internal thread form and the external thread form using buttress threads.

FIG. 5B shows a cross section of FIG. 5A of the collapsible shoulder 504, flexible throat 502 engaging the internal thread form and the external thread form. The internal thread form includes internal buttress threads 804-1 to 804-4. The external thread form includes external buttress threads 702-1 to 7024. The internal thread form and the external thread form collectively urge the cap 800 and the flexible throat 502 to seal the contained product into the collapsible tube. The cap 800 further, preferably includes an interior bulge 802 which acts upon the flexible throat 502 to urge the flexible throat 502 to engage the internal thread form and the external thread form.

As shown and discussed herein, the threads on the flexible throat 502, the flexible shoulder 504, and when applicable, the collapsible tube body 506, are preferably made of flexible materials. These flexible materials include, but are not limited to, at least one thermoset elastomeric and/or thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. An elastomeric plastic is typically a polymer blend or compound, which above its melting temperature, exhibits a thermoplastic behavior enabling it to be shaped into a fabricated article, such as a collapsible tube or cap. When the article is within its design temperature range, it exhibits elastomeric behavior without cross-linking during fabrication. The fabrication process is reversible. The article can be reprocessed and remolded. The method of making these collapsible tubes 500 may include, but is not limited to, using a mold, into which the material(s) are injected and/or blown. The material may be injected one or more times. When material is injected more than one time, the process is often known as a multi-shot molding.

Figure 6A:
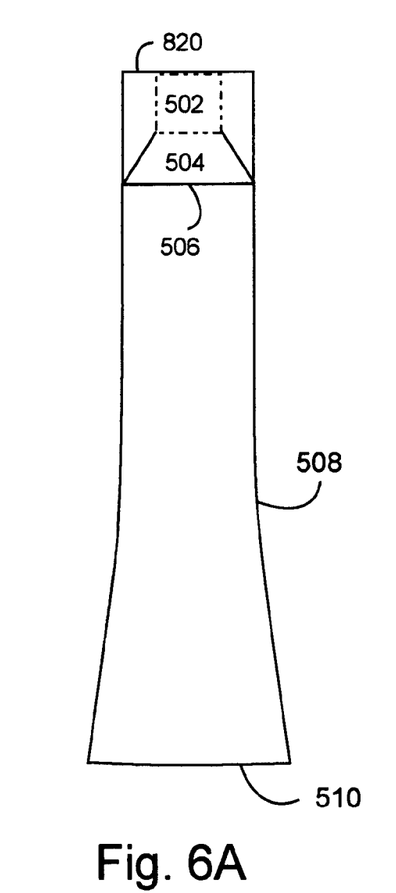
FIG. 6A shows the collapsible tube of FIG. 4 with a second cap engaged and filled with contents.
Figure 6B:
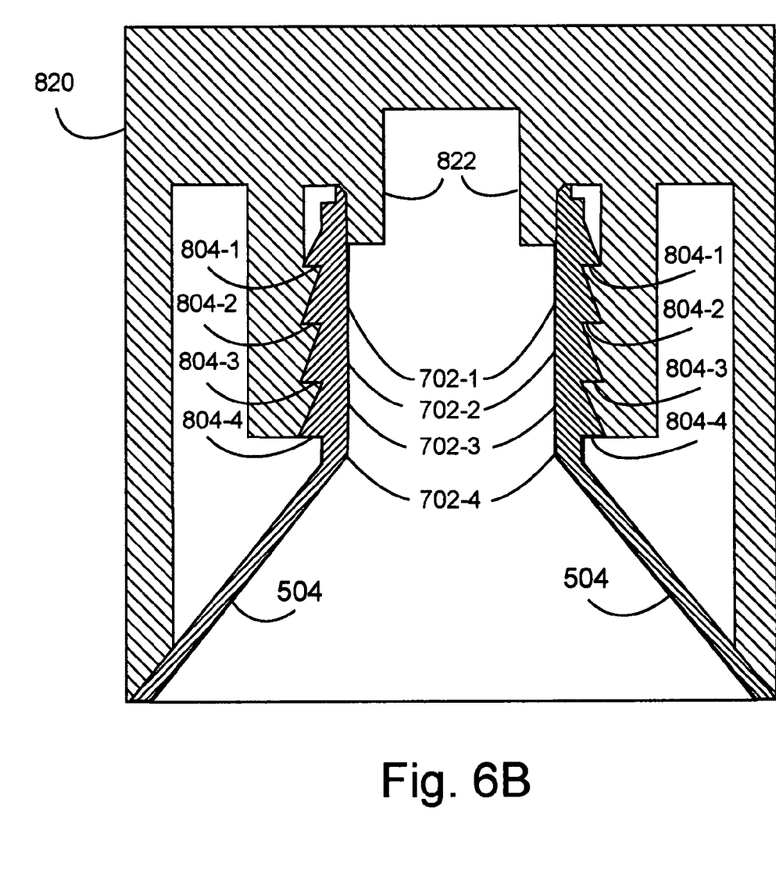
FIG. 6B shows a cross section of FIG. 6A with the collapsible shoulder and flexible throat of FIG. 5B engaging a hollow version of the second cap.
Figure 7:
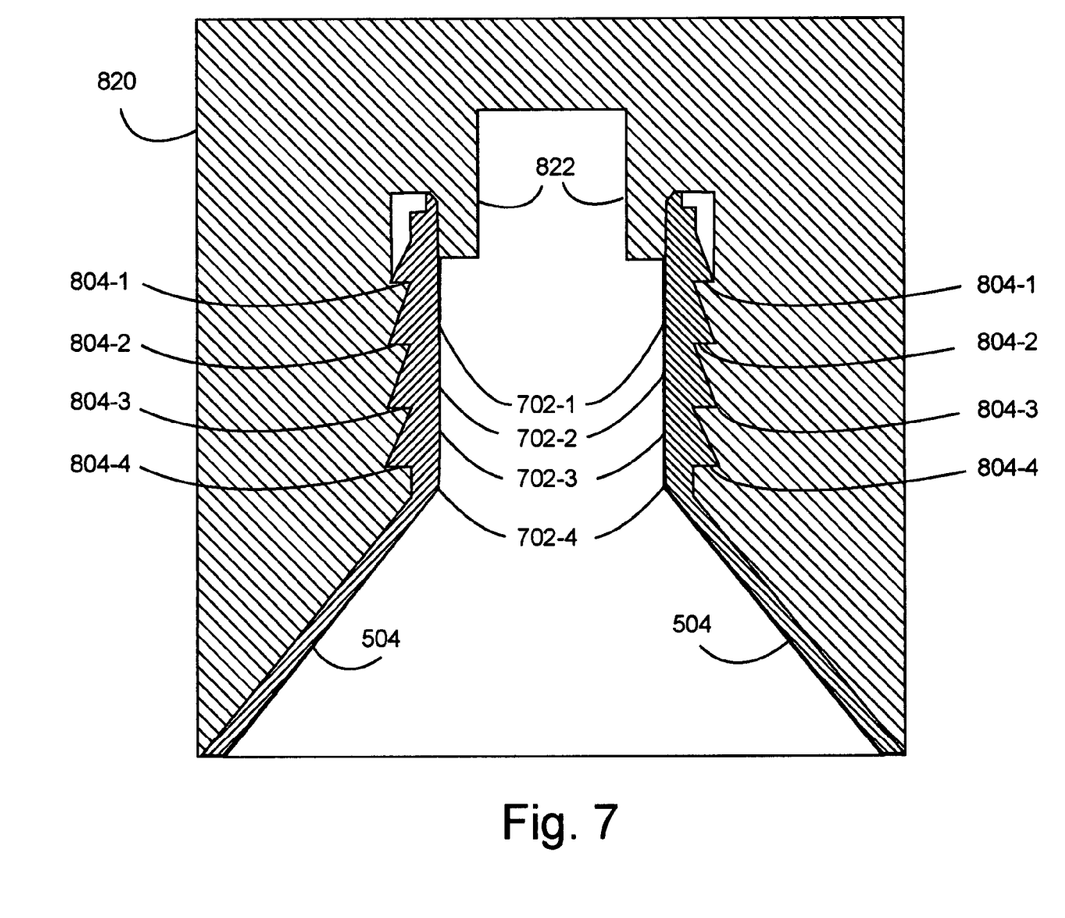
FIG. 7 shows a cross section of FIG. 6A with the collapsible shoulder and flexible throat of FIG. 5B engaging a filled version of the second cap.

In FIGS. 5B, 6B, and 7, the internal thread form slides along the external thread form, and the external thread form slides along the internal thread form to slide along each other, when the internal thread form and the external thread form engage. After they engage, continued sliding causes the internal thread form and the external thread form to lock, sealing the contained product into the collapsible tube.

One skilled in the art will recognize that various bumps and ridges in the cap and throat may be used to enhance engagement. As used herein the engagement enhancing bumps and ridges are not part of the screw sliding operations.

FIG. 6A shows the collapsible tube of FIG. 4 with a second cap 820 engaged and filled with contents. FIG. 6B shows a cross section of FIG. 6A with the collapsible shoulder 504 and flexible throat 502 of FIG. 5B engaging a hollow version of the second cap 820. FIG. 7 shows a cross section of FIG. 6A with the collapsible shoulder 504 and flexible throat 502 of FIG. 5B engaging a filled version of the second cap 820. Note the interior rim 822 included in the second cap 820 may preferably extend to below at least the first external thread 804-1 to aid in urging the reforming of the flexible throat 502. It may further preferred that the interior rim 822 extend below the second external thread 804-2, etc. One skilled in the art will recognize that many variations in the caps 820 and 800 are preferred in different situations, causing variation in at least their size, shape, number of threads, and whether or not they are hollow.

FIGS. 8A to 8D show the front view of a collapsible tube with none, one, two, and three breaks in its external threads, respectively.

FIGS. 9A to 9D shows the front view of the collapsible tubes of FIGS. 8A to 8D partially deformed by squeezing the collapsible tube bodies 506 and flexible shoulders 504.

Figures 8A, 8B, 8C, 8D:
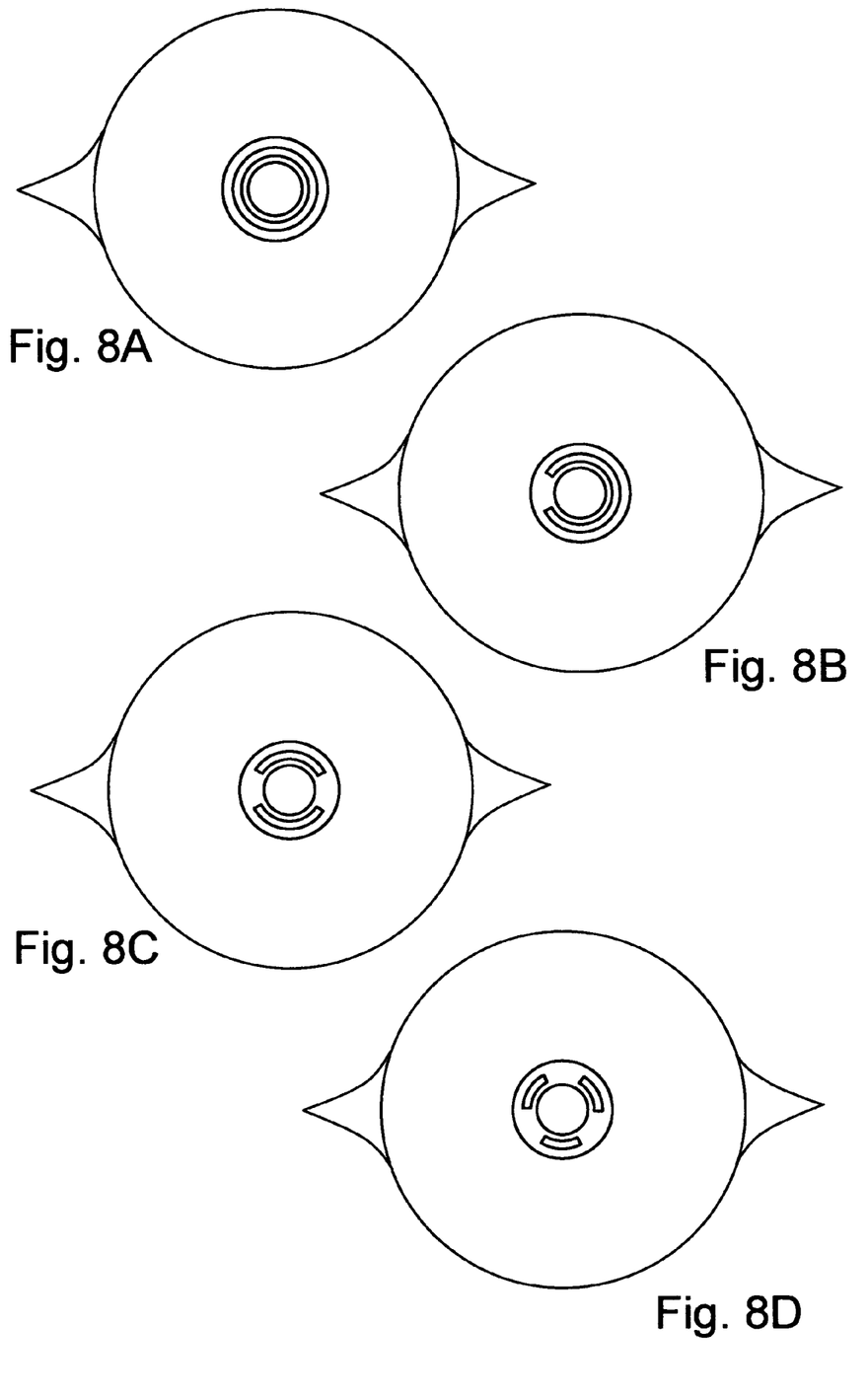
FIGS. 8A to 8D show the front view of a collapsible tube with none, one, two, and three breaks in its external threads, respectively.
Figure 9A:
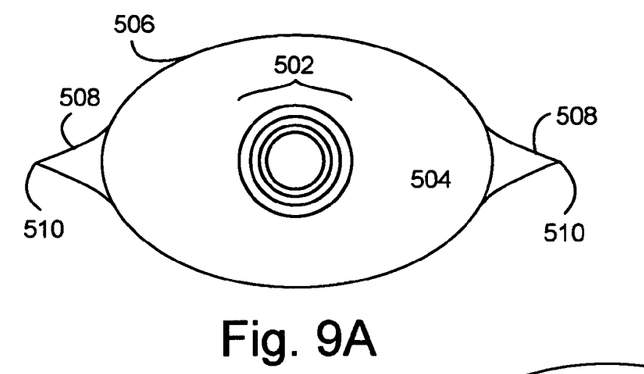
FIGS. 9A to 9D shows the front view of the collapsible tubes of FIGS. 8A to 8D partially deformed by squeezing the collapsible tube bodies and flexible shoulders.
Figure 9B:
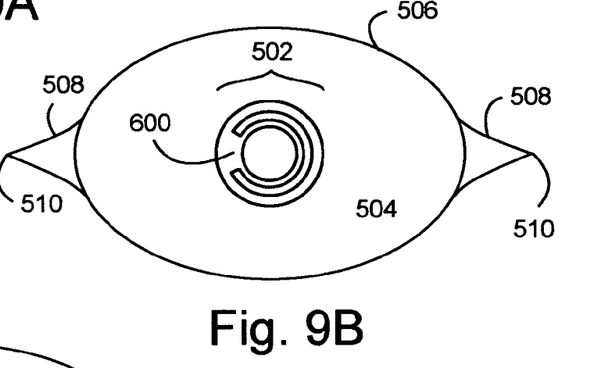

FIGS. 10A to 10D show the further squeezing of the collapsible tube of FIGS. 8A and 9A, which has no breaks in its external threads.

Figure 9C:
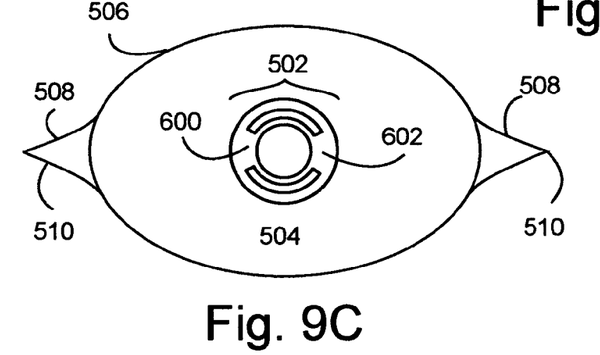
Figure 9D:
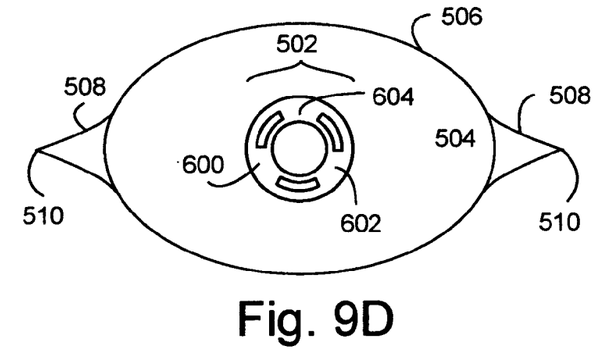
Figure 10A:
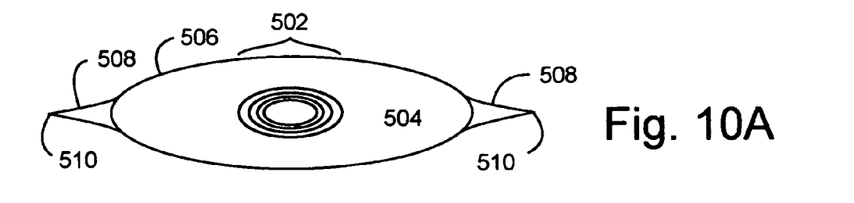
FIGS. 10A to 10D show the further squeezing of the collapsible tube of FIGS. 8A and 9A, which has no breaks in its external threads.
Figure 10B:
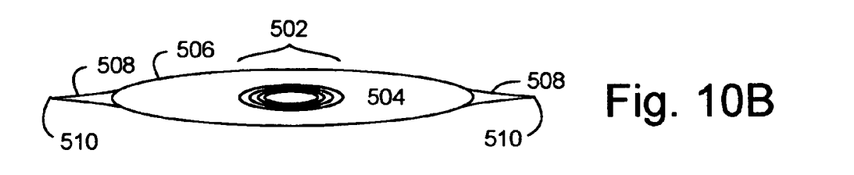
Figure 10C:
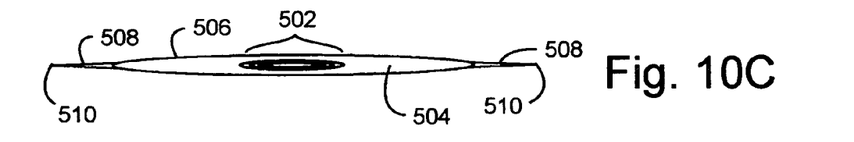
Figures 10D, 10E:
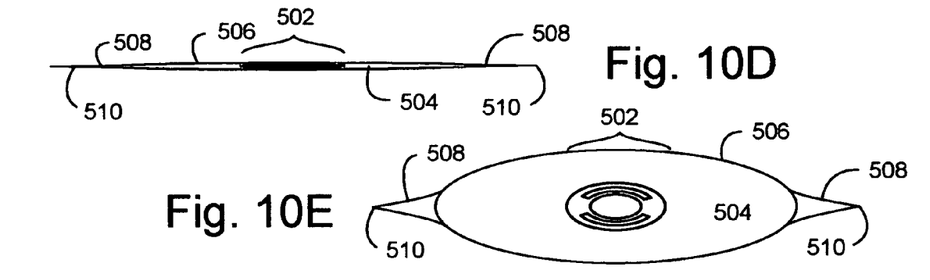
FIGS. 10E to 10H show the further squeezing of the collapsible tube of FIGS. 8C and 9C, which has a first break and a second break.
Figure 10F:
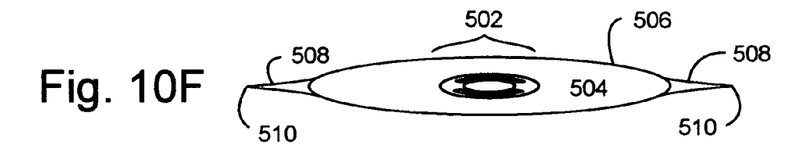
Figure 10G:
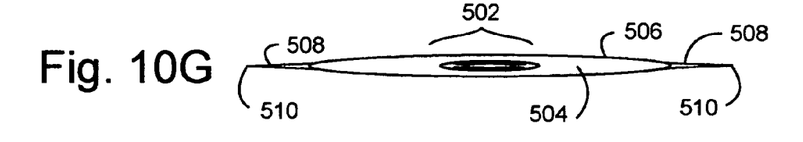
Figure 10H:
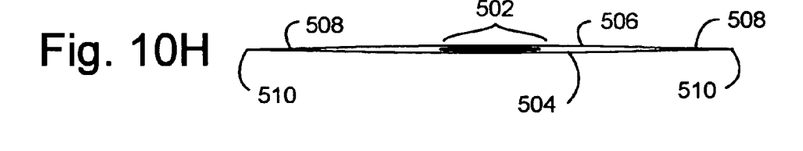
Figure 11A:
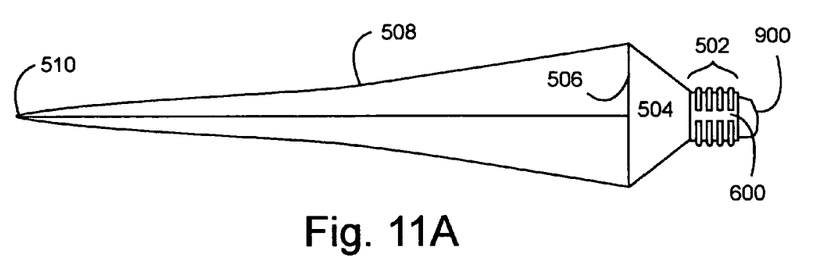
FIGS. 11A to 11D show the side view of the squeezing of the collapsible tube shown in FIGS. 9C, and 10E to 10H, with the contained product being dispensed.
Figure 11B:
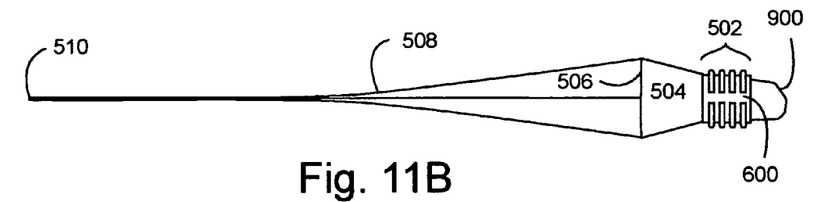
Figure 11C:
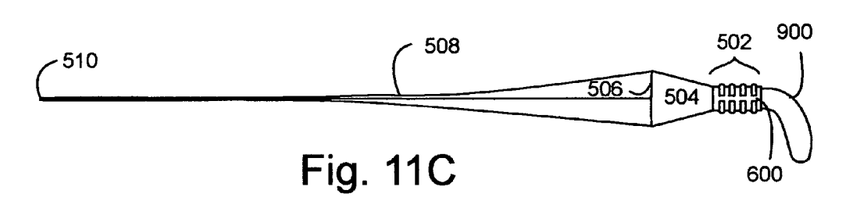
Figure 11D:
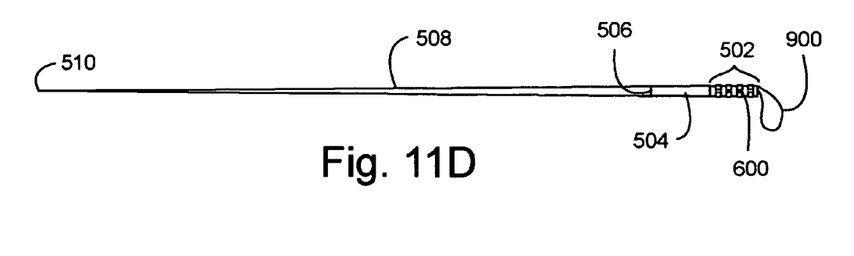

FIGS. 10E to 10H show the further squeezing of the collapsible tube of FIGS. 8C and 9C, which has a first break 600 and a second break 602.

FIGS. 11A to 11D show the side view of the squeezing of the collapsible tube shown in FIGS. 9C, and 10E to 10H, with the contained product 900 being dispensed.

This method of using a collapsible tube permits dispensing essentially all of the contained product. The contained product may be any of the following: a pharmaceutical, a personal care product, a toothpaste, a food, an artist's paint, a glue, a hazardous chemical, a grease product, and/or a viscous plastic.

Substances will be referred to herein as viscous plastics when they are viscous enough to be pressed out of a collapsible squeeze tube to form a blob or a line for various purposes, such as caulk or other sealants, compounds used to create a braille letter, or other identifying mark on items for the blind, or decorative substances that are not simply paint but create texture and mass when applied, or compounds that dry when exposed to air forming durable shapes, marks, seals, decorations, and the like.

The collapsible tube 500 may have the tube closure 510, repeatedly opened and sealed shut by using a mechanical device (sometimes known as a key). Versions of key typically include a plastic cylinder with a slit in its center that slides over the open end of the tube, rolls toward the flexible throat 504 of the collapsible tube 500 to seal the tube closure 510, and locks itself in the closed position.

The collapsible tube 500 shown in the preceding Figures may preferably be made of at least one flexible thermoset elastomeric and/or flexible thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. The cap to which the flexible threads mate may also be manufactured using existing collapsible tube manufacturing technology and materials.

The cap 800 and the cap 820 shown in the preceding Figures may preferably be made of at least one rigid thermoset elastomeric and/or rigid thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. The cap to which the flexible threads mate may also be manufactured using existing cap molding technology and materials. The interior bulge 802 on the cap that inserts into the flexible throat 502 may also be a standard cap design. The interior rim 822 on the cap that inserts into the flexible throat 502 may also be a standard cap design. These caps may also be made from conventional cap materials.

The preceding embodiments have been provided by way of example and are not meant to constrain the scope of the following claims.

What is claimed is:

1. A collapsible tube for containing at least one product, comprising:
    an external thread form on a flexible throat coupled to a flexible shoulder;
    wherein said external thread form mates with an internal thread form, included in a cap, urging said flexible throat to seal against said cap when said cap is twisted onto said flexible throat;
    wherein said flexible throat and said flexible shoulder flatten to dispense essentially all of said product;
    wherein said external thread form further comprises: at least two external open threads, each of said external open threads possesses at least one break; and
    wherein all of said breaks of all of said external open threads, form at least one column in the radial axis of said flexible throat.

2. The collapsible tube of claim 1, further comprising:
    said flexible shoulder mating to a collapsible tube body;
    wherein said flexible throat and said flexible shoulder flatten with said collapsible tube body to dispense essentially all of said product.

3. The collapsible tube of claim 1, further comprising: said flexible shoulder mating to itself.

4. The collapsible tube of claim 1, wherein each of said external threads possesses exactly one break.

5. The collapsible tube of claim 1, wherein each of said external threads possesses exactly two breaks.

6. The collapsible tube of claim 1, wherein each of said external threads possesses exactly three breaks.

7. The collapsible tube of claim 1, wherein each of said external threads possesses exactly four breaks.

8. The collapsible tube of claim 1,
wherein all of said breaks form canted columns in the radial axis of said flexible throat.

9. The collapsible tube of claim 1,
wherein all of said breaks form rectangular columns in the radial axis of said flexible throat.

10. The collapsible tube of claim 1,
wherein all of said breaks form fluted columns expanding away from said flexible shoulder.

11. The collapsible tube of claim 1,
wherein all of said breaks form fluted columns expanding toward said flexible shoulder.

12. The collapsible tube of claim 1, wherein said external open thread involves at least one of an external acme thread, an external buttress thread, an external V thread, and an external box thread.

13. The collapsible tube of claim 12, wherein said external open thread is one of said external acme thread, said external buttress thread, said external V thread, and said external box thread.

14. The collapsible tube of claim 12, wherein said external open thread is a combination of at least two of said external acme thread, said external buttress thread, said external V thread, and said external box thread.

15. The collapsible tube of claim 12, wherein said external open thread is a modification of at least one of said external acme thread, said external buttress thread, said external V thread, and said external box thread.

16. The collapsible tube of claim 1, wherein said collapsible tube contains at least two contained products.

17. The collapsible tube of claim 1, wherein said contained product is a pharmaceutical product.

18. The collapsible tube of claim 1, wherein said contained product is a personal care product.

19. The collapsible tube of claim 18, wherein said personal care product is a cosmetic.

20. The collapsible tube of claim 18, wherein said personal care product is a facial care product.

21. The collapsible tube of claim 18, wherein said personal care product is a skin care product.

22. The collapsible tube of claim 18, wherein said personal care product is a hair care product.

23. The collapsible tube of claim 1, wherein said contained product is a paint product.

24. The collapsible tube of claim 1, wherein said contained product is a toothpaste product.

25. The collapsible tube of claim 1, wherein said contained product is a food product.

26. The collapsible tube of claim 1, wherein said contained product is a glue product.

27. The collapsible tube of claim 1, wherein said contained product is a hazardous chemical.

28. The collapsible tube of claim 1, wherein said contained product is a grease product.

29. The collapsible tube of claim 1, wherein said contained product is a viscous plastic.

30. The cap of claim 1, comprising one of:
an interior bulge to act upon said flexible throat to urge said flexible throat to engage said internal thread form and said external thread form; and
an interior rim to act upon said flexible throat to urge said flexible throat to engage said internal thread and said external thread form.

31. The cap of claim 30, wherein said cap is not flexible.

32. The cap of claim 31, wherein said cap is rigid.

* * * * *